United States Patent [19]

Selmeczi

[11] 4,164,549

[45] Aug. 14, 1979

[54] LIME SCRUBBING PROCESS FOR SULFUR DIOXIDE REMOVAL FROM GASES

[75] Inventor: Joseph G. Selmeczi, Pittsburgh, Pa.

[73] Assignee: Dravo Corporation, Pittsburgh, Pa.

[21] Appl. No.: 873,280

[22] Filed: Jan. 30, 1978

[51] Int. Cl.$^2$ ............................................. C01B 17/00
[52] U.S. Cl. .................................................. 423/242
[58] Field of Search ...................... 423/242, 244, 166

[56] References Cited

U.S. PATENT DOCUMENTS

| | | | |
|---|---|---|---|
| 2,113,198 | 4/1938 | Nonhebel et al. | 423/242 |
| 3,919,393 | 11/1975 | Selmeczi | 423/242 |
| 3,919,394 | 11/1975 | Selmeczi | 423/242 |
| 3,944,649 | 3/1976 | Field | 423/242 |

*Primary Examiner*—O. R. Vertiz

*Assistant Examiner*—G. A. Heller

*Attorney, Agent, or Firm*—Parmelee, Miller, Welsh & Kratz

[57] ABSTRACT

A method for scrubbing sulfur dioxide from gaseous streams using a calcium salt-containing aqueous liquor having 250–5000 parts per million of magnesium ion to enable fast and efficient return to operation following a period of interruption of the gaseous flow by adjusting the pH of the liquor to a value between 9.8 and 12.0 during said interruption to convert sulfite ion species in the liquor to solid magnesium hydroxide and prevent oxidation thereof, and adding magnesium-containing lime to the liquor after resumption of the scrubbing process when the pH of the inlet liquor has dropped below 9.8 to the previous operational mode.

5 Claims, 1 Drawing Figure

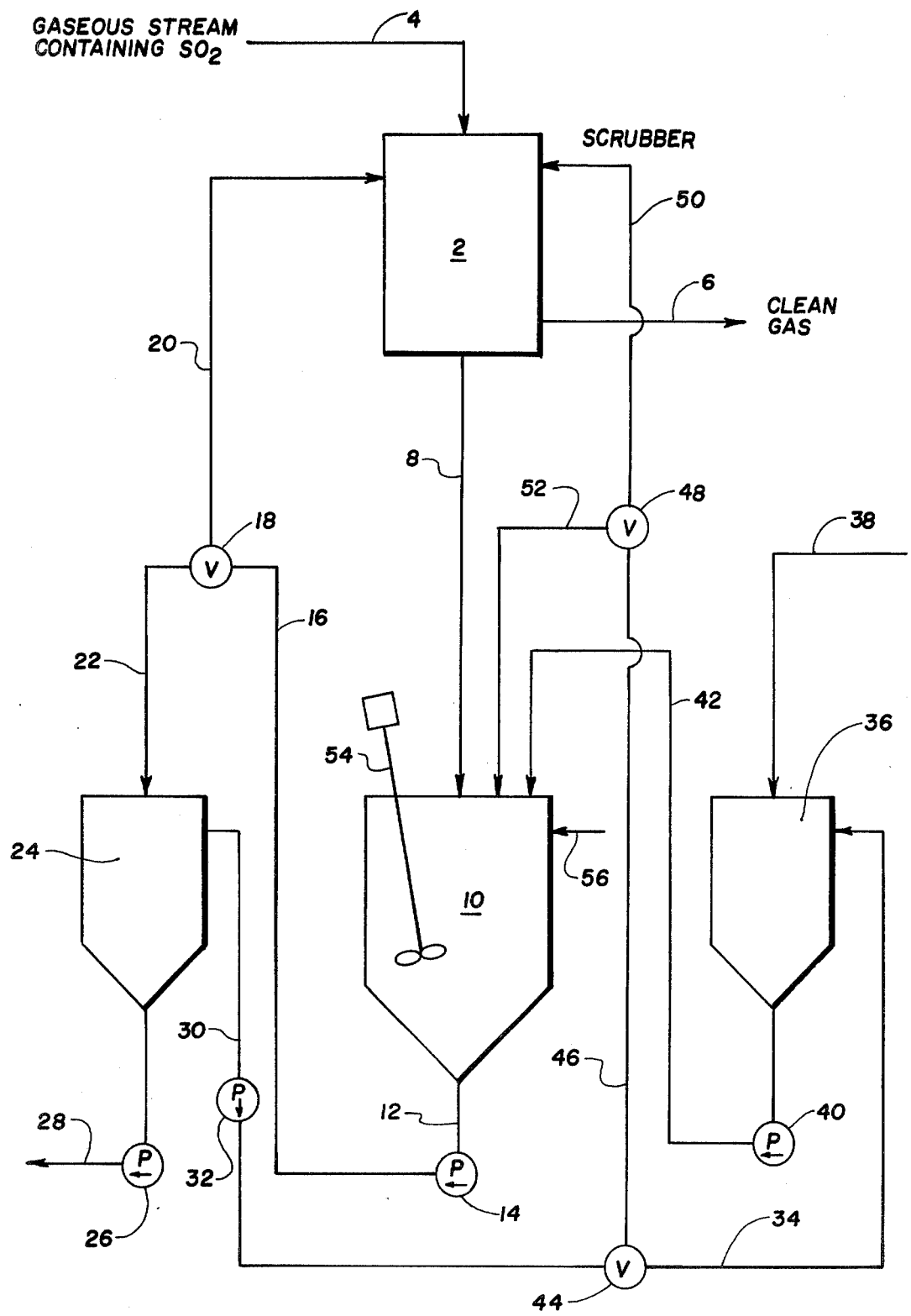

LIME SCRUBBING PROCESS FOR SULFUR DIOXIDE REMOVAL FROM GASES

BACKGROUND OF THE INVENTION

The present invention is an improvement over the processes described in U.S. Pat. No. 3,919,393 and U.S. Pat. No. 3,919,394, the contents of both said patents being incorporated by reference herein, and also an improvement over my copending application entitled "Sulfur Dioxide Removal from Gaseous Streams," Ser. No. 865,513 filed Dec. 29, 1977, the contents of said application also being incorporated by reference herein.

The operation of lime scrubbing processes for the removal of oxides of sulfur from the flue gas stream is generally a continuous process so that a power plant can at all times maintain operation within the boundaries of the environmental laws. There does occur, however, periods of time when a particular scrubbing unit is shutdown, either intentionally or due to malfunction of apparatus or other undesired shutdowns. For example, in a large power plant, a series of scrubbing units may be provided, all of which are operational during periods of peak load upon the power plant, but during periods of lesser load upon the plant capacity, operation of one or more of the scrubbing units may be unnecessary and the system could still effect scrubbing of the flue gases within the prescribed limits.

During the shutdown of a scrubbing unit, or other interruption of flow of scrubbing liquor through the scrubber, a problem arises in that the reactive species in the liquor, which are usually retained in a hold tank during the shutdown, are subject to oxidation due to contact with air. Such liquors will contain solids and, while in the hold tank, are stirred so as to prevent settling and possible plugging of the hold tank by such settling. Even where the liquor is not held but recirculation of the liquor through the scrubbing unit is maintained, the exposure of the reactive species in the liquor to air during the recirculation will cause oxidation of the reactive species. These reactive species include sulfite and bisulfite ions which, upon oxidation, will be converted to sulfate.

Depending upon the length of the shutdown or interruption of flow of the gaseous stream through the scrubber and the amount of oxygen absorbed by the scrubbing liquor, a considerable portion of the reactive sulfite ions can be oxidized to sulfate and the scrubbing liquor loses the reactive sulfite species so that the liquor will be less able to absorb the oxides of sulfur upon resumption of flow of the scrubbing liquor. Also, the oxidation of the sulfite ions to sulfates produces a super-saturated system for sulfates and is conducive to formation of gypsum which produces scaling in the system.

With the oxidation of the sulfite ions to sulfate, the scrubbing unit upon resumption of operation will not operate at the required sulfur dioxide and sulfur trioxide removal efficiencies required by the environmental laws and may be operating outside the prescribed limits for a period of six hours or more before reaching the desired operational mode.

The present method is directed to a process for treating the scrubbing liquor upon interruption of flow of the gaseous stream through the scrubbing unit so that the liquor will be capable of absorbing oxides of sulfur upon resumption of flow of oxides of sulfur through the scrubber in a short period of time and prevent excessive oxidation of sulfite ions within the liquor to sulfate during said interruption of flow.

BRIEF DESCRIPTION OF THE INVENTION

A method for obtaining fast efficient operation of a lime scrubbing process following an interruption of the flow of a gaseous stream containing oxides of sulfur through the scrubber, wherein the calcium salt-containing scrubbing liquor contains 250–5000 parts per million of magnesium ions, is provided by adjusting the pH of the liquor to a value between 9.8–12.0 during the interruption of the flow of the gaseous stream. Adjustment of the pH of the scrubbing liquor to a value between 9.8–12.0, and preferably a value of about 10.5, converts sulfite ion species in the liquor to precipitated solids and thus prevents oxidation thereof during said interruption of flow. Upon resumption of the flow of the gaseous stream and contact of the liquor therewith, the liquor is circulated through the scrubber and magnesium-containing lime is added when the inlet pH of the inlet liquor to the scrubber has reached the desired operational value below 9.8.

BRIEF DESCRIPTION OF THE DRAWINGS

The drawing illustrates schematically the present invention for the removal of oxides of sulfur from a gaseous stream.

DETAILED DESCRIPTION

In the drawing which illustrates schematically a flow diagram of the present process, a scrubbing unit 2 is shown for contact of an aqueous scrubbing stream and a gaseous stream containing oxides of sulfur. The gaseous stream 4, which can be a flue gas stream from a coal combustion unit of a power plant, enters the scrubber, is contacted with the aqueous scrubbing liquor and is exited from the scrubber 2 as a clean gas stream 6. In the scrubber 2, the gaseous stream contacts an aqueous calcium salt-containing lime scrubbing liquor which contains a magnesium ion content of between 250–5000 parts per million by weight of the liquor. The scrubbing liquor, following contact with the gas and absorbing oxides of sulfur to produce mainly calcium and magnesium sulfite and sulfate, is discharged from the scrubber 2 through line 8 to a recycle or hold tank 10. From tank 10, the effluent passes through conduit 12 to pump 14 which recycles liquor through line 16, valve 18 and line 20 back to the scrubber 2. A portion of the effluent is bled off through valve 18 through line 22 to a clarifier or settling tank 24. In the clarifier 24, the liquor is held so as to precipitate solids therefrom as a sludge slurry which is discharged therefrom through pump 26 and line 28 for disposal. Clarified supernatant liquor from the clarifier 24 is returned to the scrubbing system. Clarified liquor may be passed through line 30, pump 32 and line 34 to the lime slurry tank 36. Lime and the requisite amount of magnesium ion, in the form of magnesium oxide, hydroxide or the like, is charged to the slurry tank preferably as a concentrated aqueous slurry through line 38. The aqueous slurry of lime and magnesium is then fed through pump 40 and line 42 to the recycle tank 10 for replenishment of the aqueous scrubbing liquor. Or the clarified liquor may pass by means of valve 44 through line 46 to valve 48 from which a portion of the clarified liquor may be used to wash a demister unit in the scrubber by passage through line 50, as described in my patent, U.S. Pat. No. 3,914,378, or the clarified liquor or a portion thereof can be charged to the hold tank 10 through line 52.

The above-described known process is generally run as a continuous closed loop system with solids sludge slurry discharged through line 28 and replenishment of the lime-magnesium liquor effected through addition at line 38. During periods of time where the gaseous stream 2 is not being charged and the flow of the gaseous stream is interrupted, the system may either be shutdown and no passage of liquor through the scrubber made, or a cyclic flow of the liquor may be continued, without additions to or removals from the system being made.

During interruption of the flow of the gaseous stream 4 through the scrubber, the aqueous liquor may be maintained in the recycle tank 10 and preferably the contents of the tank are agitated, such as by a stirrer 54, to prevent sedimentation and solidification of the solids content of the liquor. During such agitation, however, oxidation of sulfites present in the liquor will occur. Or, in the alternative, during such interruption of flow of the gaseous stream through the scrubber, the aqueous liquor may be cycled from recycle tank 10, line 12, pump 14, line 16, valve 18, line 20 to the scrubber 2 and discharged through line 8 back to recycle tank 10. During such a cyclic operation also, however, oxidation of sulfites in the liquor to sulfates will occur.

The present invention provides for the prevention of the oxidation of reactive species, sulfites and bisulfites, in the liquor so that upon resumption of the flow of the gaseous stream 4 and the scrubbing liquor contact within the scrubber 2, fast return to efficient operation of the scrubbing process is effected.

In the present process, when interruption of the gaseous flow through the scrubber occurs, the pH of the scrubbing liquor is adjusted to a pH of between 9.8–12.0, and preferably to a value of about 10.5. By adjusting the pH to this range, the sulfites within the aqueous liquor which are in a soluble state will be converted to solid magnesium hydroxide and, as such, will be resistant to oxidation. The addition of lime to the aqueous liquor to adjust the pH to the requisite range will convert magnesium salts to magnesium hydroxide according to the following equations:

$$MgSO_3 + Ca(OH)_2 \xrightarrow{aqueous} CaSO_3 \cdot \tfrac{1}{2}H_2O + Mg(OH)_2 \quad (1)$$

$$Mg(HSO_3)_2 + 2Ca(OH)_2 \xrightarrow{aqueous} 2CaSO_3 \cdot \tfrac{1}{2}H_2O + Mg(OH)_2 \quad (2)$$

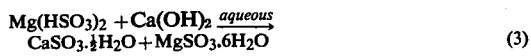
$$Mg(HSO_3)_2 + Ca(OH)_2 \xrightarrow{aqueous} CaSO_3 \cdot \tfrac{1}{2}H_2O + MgSO_3 \cdot 6H_2O \quad (3)$$

Such addition will also convert magnesium sulfate to magnesium hydroxide according to the equation:

$$MgSO_4 + Ca(OH)_2 \rightarrow CaSO_4 + Mg(OH)_2 \quad (4)$$

By converting the soluble sulfite species to insoluble magnesium hydroxide, a precipitate will be formed which is not subject to oxidation during the interruption of flow of the gaseous stream. Magnesium hydroxide will thus be available to absorb oxides of sulfur immediately upon resumption of the gaseous flow to the scrubber and contact with the aqueous liquor.

If the pH is not adjusted to a value above 9.8, the sulfite and bisulfite ions will not be converted to solid precipitates, while adjustment to a pH value in excess of about 12.0 will lead to calcium carbonate formation in the scrubber unit upon resumption of the scrubbing process. The preferred pH of about 10.5 is one which will effect the necessary conversion of sulfite and bisulfite ions to solids while preventing any significant formation of carbonates in the scrubber following resumption of the gaseous flow and contact therewith by the aqueous scrubbing liquor.

The adjustment of the pH of the aqueous liquor to the range of 9.8–12.0 can be effected either by adding additional lime slurry to the tank 10 through line 42 until the pH is raised to that range, or lime can be added directly to the tank such as at line 56 for such adjustment.

Upon resumption of the flow of the gaseous stream to the scrubber and recycle of the aqueous scrubbing liquor for contact therewith in the scrubber, lime through line 42 is not fed to the recycle tank 10 until the pH of the scrubbing liquor has returned to the preferred operational mode, an inlet pH to the scrubber of 9.8 or below. When the desired operational mode has again been established in the system, the addition of magnesium-containing lime is resumed and the system operated as before the interruption of the flow of the gaseous stream.

I claim:

1. In a lime scrubbing process for the removal of oxides of sulfur from a gaseous stream, wherein a calcium salt-containing liquor containing 250–5000 parts per million by weight of the liquor of magnesium ion is present within the scrubber, with at least a portion of the effluent from the scrubber clarified and aqueous liquor from said clarifier is returned to the scrubber, and wherein the pH of the effluent from the scrubber is maintained above 5.3 while the pH of the inlet liquor to the scrubber is maintained below 9.8, and wherein interruption of flow of said gaseous stream through the scrubber occurs, the improvement comprising:

adjusting the pH of said liquor to a value between 9.8–12.0 during interruption of flow of the gaseous stream through the scrubber to convert sulfite and bisulfite ions in said liquor to precipitated solids and prevent oxidation of the same during said interruption of flow; and upon resuming flow of said gaseous stream through the scrubber, adding magnesium-containing lime after said inlet pH has reached a value below 9.8.

2. In the lime scrubbing process as defined in claim 1, the improvement wherein said pH is adjusted at the time of commencement of said interruption of flow of said gaseous stream.

3. In the lime scrubbing process as defined in claim 1, the improvement wherein said pH is adjusted by adding lime to said liquor.

4. In the lime scrubbing process as defined in claim 3, the improvement wherein said lime contains magnesium oxide.

5. In the lime scrubbing process as defined in claim 1, the improvement wherein said pH is adjusted to a value of about 10.5.